No. 851,943. PATENTED APR. 30, 1907.
G. E. KETCHUM.
DRAG.
APPLICATION FILED SEPT. 28, 1906.
2 SHEETS—SHEET 2.
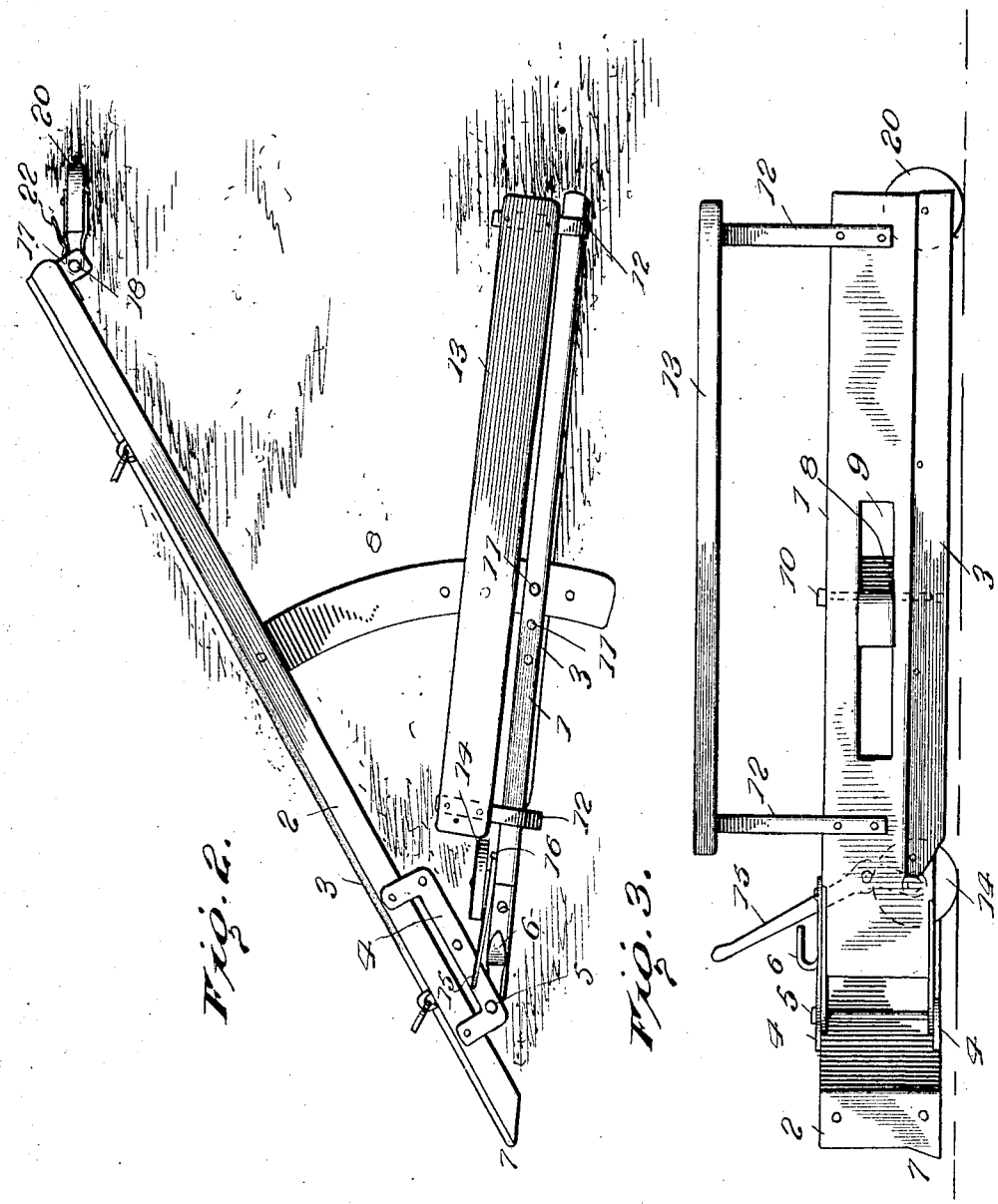
Witnesses
Inventor
G. E. Ketchum
By R. H. A. B. Lacey,
Attorneys

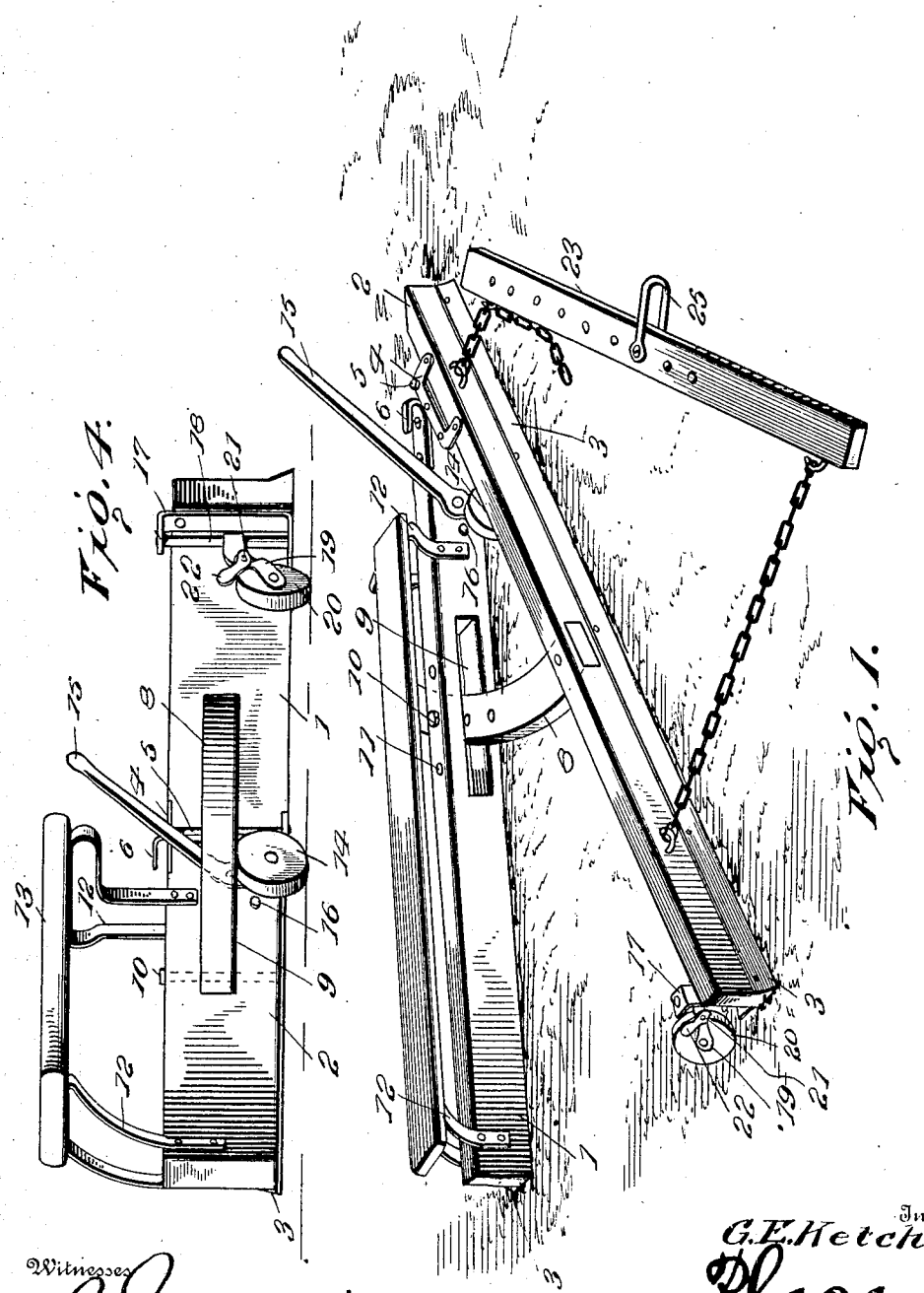

UNITED STATES PATENT OFFICE.

GEORGE E. KETCHUM, OF MARCELINE, MISSOURI.

DRAG.

No. 851,943.      Specification of Letters Patent.      Patented April 30, 1907.

Application filed September 28, 1906. Serial No. 336,639.

*To all whom it may concern:*

Be it known that I, GEORGE E. KETCHUM, a citizen of the United States, residing at Marceline, in the county of Linn and State of Missouri, have invented certain new and useful Improvements in Drags, of which the following is a specification.

This invention relates to that type of devices or implements commonly called drags and is designed for use for scraping purposes generally, as for instance, in leveling and clearing barn-yards, being especially adapted for use, however, for road grading, smoothing and ditching purposes. The various uses for which the invention is designed are many and will be readily apparent to those versed in the art to which it appertains.

For a full understanding of the invention and the merits thereof and also to acquire a knowledge of the details of construction of the means for effecting the result, reference is to be had to the following description and accompanying drawings, in which:

Figure 1 is a perspective view of a drag embodying the invention; Fig. 2 is a top plan view; Fig. 3 is a side elevation; and, Fig. 4 is a rear elevation.

Corresponding and like parts are referred to in the following description and indicated in all the views of the drawings by the same reference characters.

Specifically describing the invention, the numeral 1 indicates a longitudinal drag bar and the numeral 2 a scraping bar connected therewith. The bars 1 and 2 are so arranged as to normally occupy diverging positions toward the rear ends thereof and each bar is provided at its outer side with a scraping and protecting blade 3. The manner of connecting the two bars 1 and 2 together is peculiar. the scraping bar 2 being provided at its upper and lower portions, and near the front end thereof, with offstanding U-shaped plates 4, the outer portions of which are provided with a plurality of openings adapted to receive a pivot-pin 5, the latter passing through openings in the outer ends of plates 6 which project from the front extremity of the drag bar 1. The arrangement of the plates 4 is such that the front end of the scraping bar 2, irrespective of the points of connection to which the pivot 5 may be adjusted, extends in front of the forward end portion of the drag bar 1. This arrangement of the scraping bar 2, or more properly speaking, the disposition of the connecting means between the bars 1 and 2, is advantageous under certain conditions of use. For instance, the front end of the scraping bar 2 has a blade or cutter 7 applied thereto and this portion of the scraping blade will readily scrape off small ridges located at the edges of large ditches near the side of a road. On country roads, especially on down grades or inclines, the roads are washed out until they are lower at the center than at the sides, the usual drainage ditch remaining, however, at opposite sides. The ridges which are above mentioned are those which form between the central portions of the roads and ditches at the sides, and they may be advantageously reduced or removed by the action of the front end of the scraping bar 2. Furthermore the arrangement of the scraping bar protects the connection between it and the drag bar in an obvious manner.

Not only are the bars 1 and 2 adjustably connected together at the front ends by means of the pin 5, but the angle at which the side bars are arranged relatively to one another is variable by reason of the position of the arch shaped arm 8 which projects from the scraping bar 2 and passes through a slot 9 in the drag bar 1. The outer end portion of the arm 8 forms a plurality of openings adapted to receive a pin 10 which is passed through one of a number of openings 11 which are provided at intervals in the length of the drag bar 1. The openings 11 are provided in plurality so that the pin 10 may connect the arm 8 with the drag bar 1 when the pivot 5 is in any of its adjusted positions with respect to the plates 4, the arm 8 thereby is adjustably connected with the drag bar 1 longitudinal of the latter and, furthermore, the arm is adapted for adjustable connection longitudinal of itself with respect to the drag bar, to vary the angle of the bars 1 and 2.

Projecting upwardly from the front and rear end portions of the drag bar 1 are standards 12 which carry a seat 13 of a suitable length admitting of one or more persons being supported thereon.

It is necessary, under some conditions that the scraping bar 2 be elevated from the ground in order that the implement or device may readily pass over obstructions, such as rocks, stumps, or the like and therefore a caster wheel 14 at the front end of the drag bar 1, being journaled to the lower end portion of the lever 15, is pivoted to said drag bar. The upper portion of the lever 15 has a handle by which the lever may be operated and the forward movement of the handle will lower the wheel 14 so that the latter will carry the device and raise the same from the ground. The downward movement of the wheel 14 is limited by an offstanding stop 16 projecting from the bar 1. In like manner, at the rear end portion of the scraping bar 2, is arranged an offstanding yoke 17, the sides of which are connected by a vertical rod 18. Adjustably mounted on the rod 18 is a small wheel 20 mounted therebetween, the sides of the standard 19 are connected together by a bolt 21, and a lever nut 22 is adjustably mounted upon one end of the bolt 21 so as to cause the sides of the standard 19 to be adjustably connected together in order that the standard may be held in an adjusted position vertically on the rod 18, opposite side portions of the standard being adapted to bind against the rod 18 when the nut is turned.

Suitable draft means will be provided for the device and for this purpose a draft beam 23 is arranged at the outer side of the scraping bar 2 and is adjustably connected at opposite ends therewith by means of chains or similar connections therefor. The draft beam 23 has a plurality of openings in its length to admit of the clevis 25, which latter may be attached to the whiffletree. The front end portion of the drag 1 may be provided with the upwardly projecting hook 6.

The various purposes for which the drag may be employed are not herein set forth in detail, as they will be obvious to those versed in the art to which the invention relates, but the adjustable connection established between the bars 1 and 2 at the front ends thereof will admit of variations in the relative arrangement of these members according to actual conditions of service. The construction of the device, furthermore, is very simple, substantial and durable, and will therefore be seen to be advantageous from a practical standpoint as an article of manufacture.

The foremost of the chains or connections connecting the draft beam 23 with the scraping bar 2 will be sufficiently long to admit of passage of said chain from the hook, by which it is connected to the beam 23, and to the hook 6 at the front end of the drag bar 1. By varying the point of connection of the beam 23 relative to the foremost chain aforesaid, it will be obvious that a greater or less amount of draft may be exerted to the scraping bar and drag bar, whereby either of said bars may be caused to cut more deeply as is desired, this being especially advantageous. The nearer the point of connection of the member 25 to the hook 6, the greater will be the draft upon the drag bar 1 and an opposite effect will be obtained by adjusting the point of connection of the member 25 relatively to the bar 2, in an opposite direction.

The detachable pivotal connection 5 is advantageous as it permits of ready separation of the bars 1 and 2 so that they may be lifted by one man, if it be desired to load the implement into a wagon or vehicle. The seat 13 will, of course, be so arranged as not to interfere with the operation of the lever 15.

Having thus described the invention, what is claimed as new is:

1. In a drag of the class described, the combination of drag and scraping bars, means adjustably connecting the front end portions of said bars together, and means for holding the bars at a predetermined angle relatively to one another.

2. In a drag of the class described, the combination of drag and scraping bars, a pivotal connection between the front end portion of said bars, means for adjusting the pivotal connection and a member adjustably connecting the rear portions of the bars for holding the latter at a predetermined angle relatively to one another.

3. In a drag of the class described, the combination of drag and scraping bars, plates offstanding from the front end portion of the scraping bar, a pivot pin at the front end of the drag bar and adapted for adjustable connection with the plates applied to the scraping bar, an arm projecting from the scraping bar, and means for adjustably connecting said arm with the drag bar.

4. In a drag of the class described, the combination of drag and scraping bars, means for connecting the front end of the drag bar with the scraping bar at different points in the length of the latter, and means for connecting the scraping bar with the drag bar at different points in the length of said drag bar.

5. In a drag of the class described, the combination of drag and scraping bars, means for connecting the front end of the drag bar with the scraping bar at different points in the length of the latter, and means for connecting the scraping bar with the drag bar at different points in the length of said drag bar, the last mentioned connecting means being adjustable to vary the angle of the drag and scraping bars.

6. In a drag of the class described, the combination of a drag bar and a scraping bar, means connecting the front end of the drag bar with the scraping bar intermediate of the ends of the latter, whereby the ends of the scraping bar project beyond it in advance of the drag bar, and means connecting the rear portion of the drag and scraping bars.

7. In a drag of the class described, the combination of drag and scraping bars, means for connecting the drag bar with the scraping bar between the ends of the latter, whereby the front ends of the scraping bar project from and in advance of the drag bar, and a blade applied to the projecting end of the scraping bar for the purpose specified.

8. In a drag of the class described, the combination of a drag bar and a scraping bar, means for elevating said bars from the front, including a yoke offstanding from the scraping bar, a rod applied to said yoke, and a clevis having a standard adjustably connected with the rod and the yoke aforesaid as specified.

9. In a drag of the class described, the combination of drag and scraping bars, means for connecting the front end of the drag bar with the scraping bar at different points in the length of the latter, and means connecting the rear ends of the drag and scraping bars.

In testimony whereof I affix my signature in presence of two witnesses.

GEORGE E. KETCHUM. [L. S.]

Witnesses:
 GEORGE B. SMITH,
 ALTON CHRISMAN.